(12) United States Patent
Muraoka et al.

(10) Patent No.: US 11,745,697 B2
(45) Date of Patent: Sep. 5, 2023

(54) SIDE VEHICLE-BODY STRUCTURE OF VEHICLE

(71) Applicant: MAZDA MOTOR CORPORATION, Hiroshima (JP)

(72) Inventors: Shuji Muraoka, Hiroshima (JP); Kosuke Nagatomo, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/835,212

(22) Filed: Jun. 8, 2022

(65) Prior Publication Data
US 2023/0067279 A1    Mar. 2, 2023

(30) Foreign Application Priority Data

Aug. 27, 2021 (JP) .................................. 2021-138889

(51) Int. Cl.
*B60R 22/34* (2006.01)
*B62D 21/11* (2006.01)
*B62D 25/02* (2006.01)

(52) U.S. Cl.
CPC .............. *B60R 22/34* (2013.01); *B62D 21/11* (2013.01); *B62D 25/02* (2013.01); *B60R 2022/3402* (2013.01)

(58) Field of Classification Search
CPC ................................................... B60R 22/34
See application file for complete search history.

(56) References Cited

U.S. PATENT DOCUMENTS

| | | | | |
|---|---|---|---|---|
| 4,734,323 A | * | 3/1988 | Sato | B60R 13/0815 181/294 |
| 8,955,635 B2 | * | 2/2015 | Idaka | B62K 11/04 180/300 |
| 8,998,296 B2 | * | 4/2015 | Eipper | B62D 25/025 296/29 |
| 2003/0090129 A1 | * | 5/2003 | Riley | B62D 21/152 296/203.03 |
| 2022/0135143 A1 | * | 5/2022 | Abe | B21D 22/20 296/203.01 |

FOREIGN PATENT DOCUMENTS

| | | | |
|---|---|---|---|
| JP | 2009-083826 A | | 4/2009 |
| JP | 2009083826 A | * | 4/2009 |

* cited by examiner

*Primary Examiner* — Drew J Brown
*Assistant Examiner* — Shams Dhanani
(74) *Attorney, Agent, or Firm* — Studebaker & Brackett PC

(57) ABSTRACT

There are provided a side panel constituting a vehicle side face at a higher level than a damper attachment portion suspending a rear wheel, a retractor fixed to a cabin-inside face of the side panel, a frame member forming a closed-cross section extending vertically in corporation with the side panel, and a reinforcing member fixed to the side panel. The reinforcing member comprises a retractor attachment portion to attach the retractor, a gusset portion to partition the closed-cross section of a C pillar reinforcement vertically, and a vibration-damping joint portion joined to the side panel via a vibration-damping material. Herein, the reinforcing member is formed integrally by a member which is configured to be continuous over a range of the retractor attachment portion, the gusset portion and the vibration-damping joint portion.

11 Claims, 9 Drawing Sheets

SIDE VEHICLE-BODY STRUCTURE OF VEHICLE

BACKGROUND OF THE INVENTION

The present invention relates to a side vehicle-body structure of a vehicle which comprises a rear suspension suspending a rear wheel, a side panel constituting a side face of the vehicle at a higher level than a rear-suspension attachment portion to attach the rear suspension to the vehicle, and a seatbelt retractor attached to a cabin-inside face of the side panel.

A structure of the retractor for attaching the seatbelt in which the retractor is fixed to a side face of the vehicle at a front attachment portion and a rear attachment portion is known.

This retractor is fixed to the vehicle's side face in a cantilever state such that it is inwardly, in a vehicle width direction, offset from the vehicle's side face. Accordingly, in a vehicle's collision mode in which the seatbelt gets locked, a forward tension load is inputted to the retractor from the seatbelt. Thereby, in a case where deformation of the vehicle's side face moving outwardly, in the vehicle width direction, at the front attachment portion is generated, breakage of the rear attachment portion being peeled inwardly, in the vehicle width direction, off the vehicle's side face may happen easily.

Further, since some vibration caused by a road-surface input from the rear suspension is transmitted to the retractor along the vehicle's side face in normal vehicle's traveling, there is a concern that vertical vibration may happen at the retractor, so that some abnormal noise may be generated from an internal mechanism.

For these problems, a structure in which a reinforcing member (a retractor attachment reinforcement (40)) which extends forwardly so as to connect around an attachment portion of the retractor to the vehicle's side face and a C pillar reinforcement (12) is provided has been proposed in order to increase the rigidity around the retractor attachment portion and a vehicle's rear portion (see Japanese Patent Laid-Open Publication No. 2009-083826).

Herein, although this reinforcing member provided at the retractor attachment portion to the vehicle's side face may attain some functional improvements for suppressing the vertical vibration of the retractor during the vehicle traveling and also suppressing the deformation of the retractor attachment portion in the vehicle collision, the weight and manufacturing costs of a vehicle body may be improperly increased, such as increases of the plate thickness of the reinforcing member or the number of the attachment portions (fastening portions) of the reinforcing member to the vehicle's side face. Accordingly, there is still room for consideration (improvement).

SUMMARY OF THE INVENTION

The present invention has been devised in view of the above-described problems, and an object of the present invention is to provide a side vehicle-body structure of a vehicle which can properly attain suppression of the vertical vibration of the retractor during the vehicle traveling and suppression of the deformation of the retractor attachment portion in the vehicle collision, suppressing the increase of the weight and manufacturing costs.

The present invention is a side vehicle-body structure of a vehicle, comprising a rear suspension suspending a rear wheel, a side panel constituting a side face of the vehicle at a higher level than a rear-suspension attachment portion to attach the rear suspension to the vehicle, a seatbelt retractor attached to a cabin-inside face of the side panel, a frame member forming a closed-cross section extending vertically in corporation with the side panel, and a reinforcing member attached to the side panel, wherein the reinforcing member comprises a retractor attachment portion to attach the seatbelt retractor, a gusset portion to partition the closed-cross section of the frame member vertically, and a vibration-damping joint portion joined to the side panel via a vibration-damping material, and the reinforcing member is formed integrally by a member which is configured to be continuous over a range of the retractor attachment portion, the gusset portion and the vibration-damping joint portion.

According to the present invention, since when the vibration caused by the road-surface input from the rear suspension (the vibration inputted to the rear-suspension attachment portion via the rear suspension from the rear wheel during the vehicle traveling) is transmitted to the reinforcing member, this vibration is damped by the vibration-damping joint portion, the vibration transmitted to the seatbelt retractor is so reduced that the vertical vibration of the seatbelt retractor can be suppressed.

Further, since the gusset portion supports the input load to the retractor from the seatbelt in the collision mode in which the seatbelt gets locked inside the cross section of the frame member, the deformation of the retractor attachment portion can be suppressed.

Accordingly, the suppression of the vertical vibration of the retractor during the vehicle traveling and the suppression of the deformation of the retractor attachment portion in the vehicle collision can be properly attained without any improperly increasing the weight and manufacturing costs.

In an embodiment of the present invention, the retractor attachment portion may be provided at a higher level than the vibration-damping joint portion.

According to this embodiment, vibration energy (vibration) transmitted to the retractor attachment portion along the side panel from the rear-suspension attachment portion can be effectively suppressed (damped) by the vibration-damping joint portion provided in the middle of a transmission path of the vibration energy.

In another embodiment of the present invention, the vibration-damping joint portion may be provided at a point of the reinforcing member which corresponds to the closed-cross section in a vehicle side view.

In the above-described structure, the frame member provided at the side panel corresponds to a load transmission path where the vibration energy is transmitted upwardly from the rear-suspension attachment portion. Therefore, according to this embodiment, since the vibration-damping joint portion is provided at part of the frame member which corresponds to the load transmission path, the vibration energy (vibration) can be suppressed (damped) effectively by the vibration-damping joint portion.

In another embodiment of the present invention, the vibration-damping joint portion may include a bead which partially protrudes toward an inward side or an outward side, in a vehicle width direction, of the vibration-damping joint portion so as to engage with the vibration-damping material and extends in a longitudinal direction.

According to this embodiment, the attachment of the seatbelt retractor can be suppressed from being deformed in the vehicle width direction in the collision mode in which the seatbelt gets locked. That is, the vibration damping material can be prevented from dropping from the vibration-damping joint portion during vehicle manufacturing, and also since the bead is located, in the vertical direction, between the retractor attachment portion and the gusset portion at the reinforcing member, the same effect as a high-rigidity portion, which will be described later, can be provided.

In another embodiment of the present invention, the retractor attachment portion may be located at a position spaced apart, in a longitudinal direction, from the frame member, and a high rigidity portion which is configured to provide deformation suppression against a bending input applied in a vehicle width direction may be provided at the reinforcing member at a point located between, in the longitudinal direction, the retractor attachment portion and the gusset portion.

According to this embodiment, it can be suppressed by the high rigidity portion that the reinforcing member is deformed by a load applied in the vehicle width direction to be inputted to the reinforcing member from the retractor attachment portion in the vehicle collision.

Consequently, the reinforcing member can firmly receive the load applied in the vehicle width direction to be inputted to the reinforcing member from the retractor attachment portion by using the gusset portion provided inside its closed-cross section.

In another embodiment of the present invention, the high-rigidity portion may be a flange portion which is formed at an edge portion extending in the longitudinal direction of the reinforcing member.

According to this embodiment, the reinforcing member can be reinforced with a simple structure without increasing the weight of the vehicle body which may be caused by providing an additional reinforcing member or thickening the plate thickness of the reinforcing member.

Herein, any shape of the above-described flange portion is applicable as long as the flange portion is formed at the edge portion extending in the longitudinal direction of the reinforcing member.

In another embodiment of the present invention, the high-rigidity portion may be a striker attachment portion to attach a striker fixed to the cabin-inside face of the side panel to the reinforcing member.

According to this embodiment, since the side panel and the reinforcing member can be integrated and thereby reinforced by each other at the striker attachment portion, it can be suppressed by the striker attachment portion that the reinforcing member or the side panel are deformed by the load applied in the vehicle width direction to be inputted to the reinforcing member from the retractor attachment portion in the vehicle collision.

Further, a load applied toward an outward side, in the vehicle width direction, to be inputted to the reinforcing member from the striker attachment portion can be supported by the gusset portion, too. Specifically, in a case where a large baggage is put in a baggage room provided at a vehicle-body rear portion, there is a concern that the baggage may slide forwardly and hit against a seatback of a rear seat because of an inertia of the baggage in the vehicle collision (frontal collision). In this case, the load applied toward the outward side, in the vehicle width direction, is inputted to the reinforcing member from the striker attachment portion. The gusset portion can firmly support this load applied toward the outward side, in the vehicle width direction, to be inputted to the reinforcing member from the striker attachment portion as well.

In another embodiment of the present invention, the striker attachment portion may be a rear-side striker attachment portion which is provided at a point closer to the retractor attachment portion, in a vehicle longitudinal direction, than the frame member, the striker may be fixed to the reinforcing member by the rear-side striker attachment portion and a front-side striker attachment portion which is provided at a point corresponding to the closed-cross section in a vehicle side view, and a striker base portion provided at the striker may be provided to extend between the rear-side striker attachment portion and the front-side striker attachment portion.

According to this embodiment, since the rear-side striker attachment portion provided at the point closer to the retractor attachment portion, in the vehicle longitudinal direction, than the frame member and the front-side striker attachment portion provided inside the closed-cross section are connected via the striker base portion, the reinforcing effect of the reinforcing member by means of the rear-side striker attachment portion against the load applied in the vehicle width direction to be inputted to the reinforcing member from the rear-side retractor attachment portion can be enhanced.

In another embodiment of the present invention, the retractor attachment portion may be a front-side retractor attachment portion which attaches a point of the seatbelt retractor which is located on a forward side of a gravity center of the seatbelt retractor, and the frame member and the reinforcing member may be fixed on a cabin outside of the side panel.

According to this embodiment, since the gusset portion is configured to be stretched against the load inputted to the reinforcing member toward the outward side, in the vehicle width direct, from the front-side striker attachment portion in the collision mode in which the seatbelt gets locked, the deformation of the seatbelt-retractor attachment portion in the vehicle collision can be suppressed effectively.

Herein, the present invention is not limited to the above-described embodiment's structure in which the frame member and the reinforcing member are fixed on the cabin outside of the side panel, and these member may be fixed on a cabin inside of the side panel.

The present invention will become apparent from the following description which refers to the accompanying drawings.

DETAILED DESCRIPTION OF THE INVENTION

Hereafter, an embodiment of the present invention will be described specifically referring to the drawings. Herein, since a side face of a rear portion of a vehicle of the present embodiment is substantially symmetrical laterally of the present embodiment, a structure of the right-side side face of the vehicle rear portion will be described. In the drawings, an arrow F shows a vehicle forward side, an arrow U shows a vehicle upward side, an arrow R shows a vehicle rightward side, an arrow L shows a vehicle leftward side, an arrow OUT shows an outward side in a vehicle width direction (cabin outside), and an arrow IN shows an inward side in the vehicle width direction (cabin inside).

Figure 1:
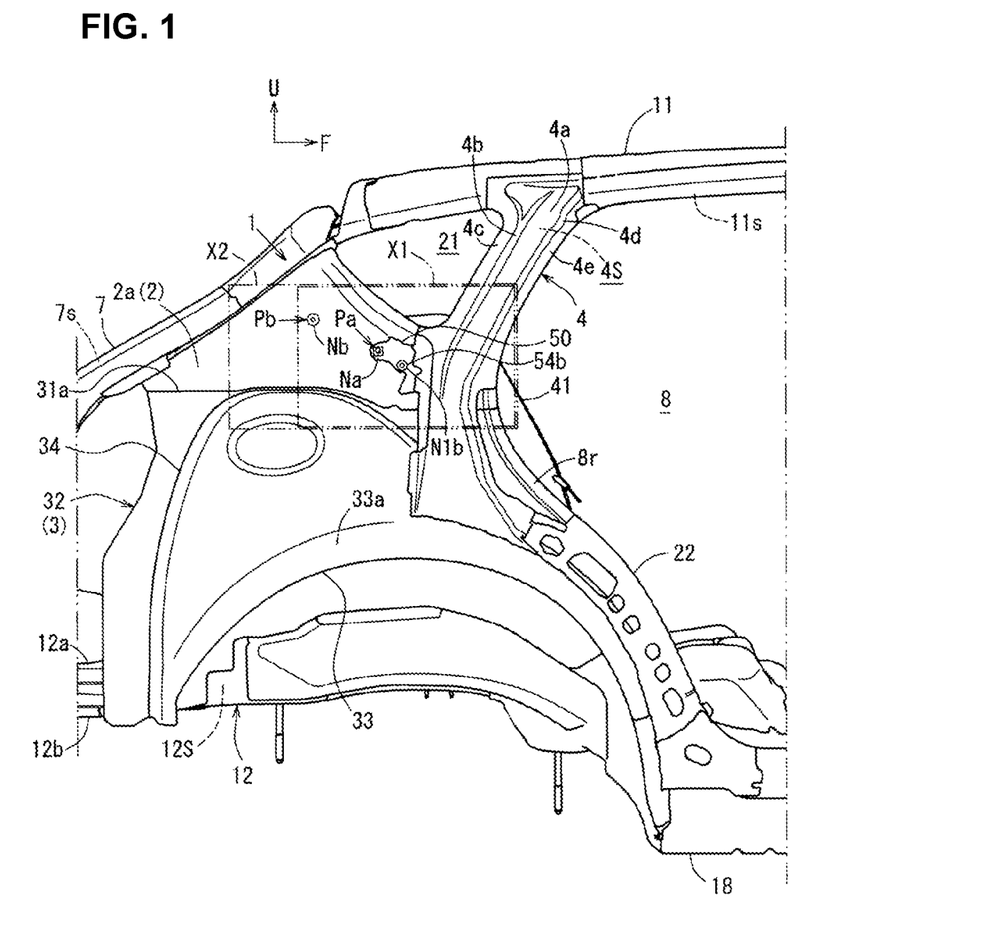
FIG. 1 is a side view of a major part of a side portion of a vehicle rear portion of the present embodiment, when viewed from a cabin outside.
Figure 2:
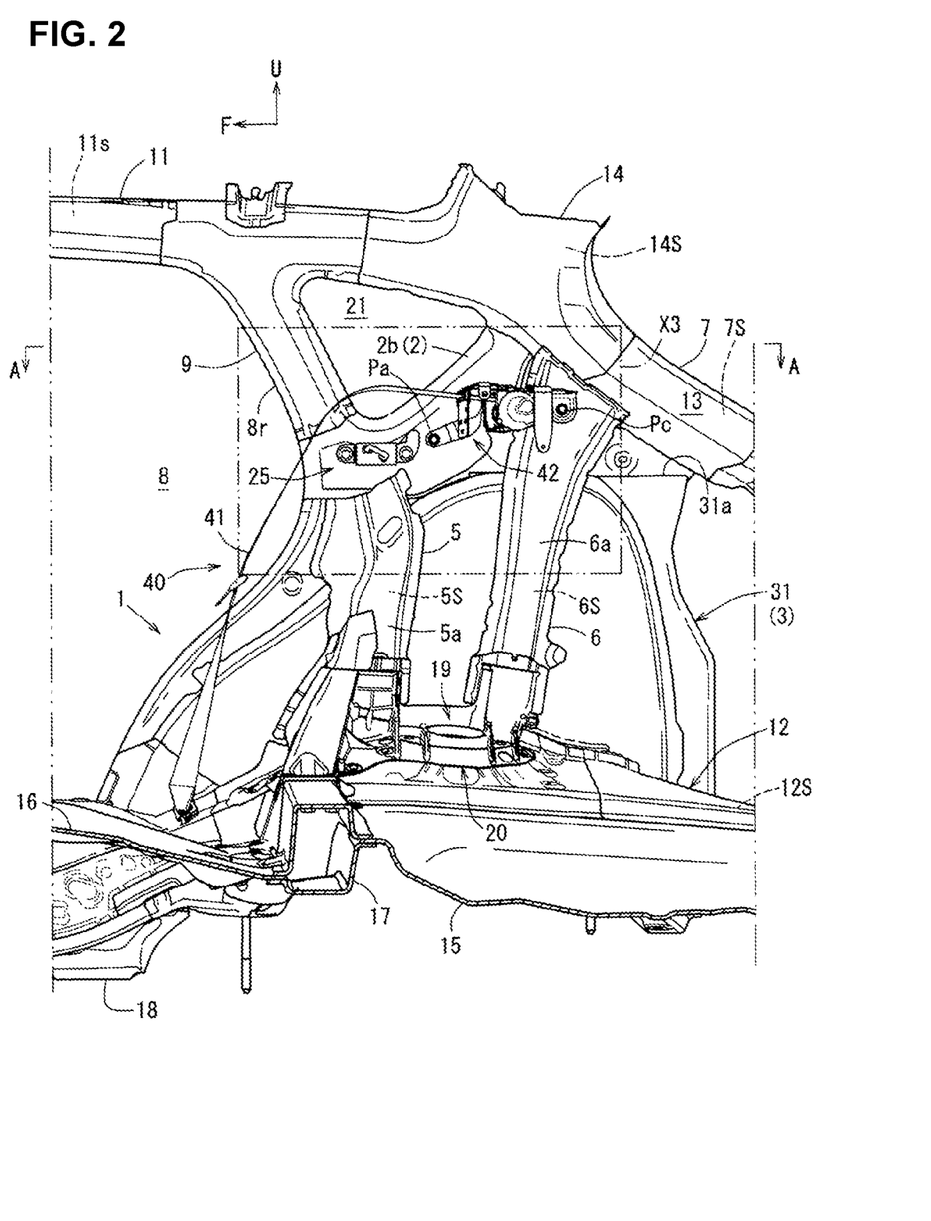
FIG. 2 is a side view of the major part of the side portion of the vehicle rear portion of the present embodiment, when viewed from a cabin inside.

The present embodiment shows a side vehicle-body structure which is applied to a door-hatchback type of automobile, and FIG. 1 is a right-side face view of a major part of a side face 1 of the rear portion of the automobile and its surrounding portion, when viewed from the outward side in the vehicle width direction. FIG. 2 is a center-vertical sectional view of a vehicle-body rear portion of the automobile which substantially corresponds to the above-described major part of the side face 1 and its surrounding portion, when viewed from the inward side in the vehicle width direction.

As shown in FIGS. 1 and 2, the side face 1 of the vehicle-body rear portion of the automobile of the present embodiment comprises a side panel 2, a wheelhouse 3, a C pillar reinforcement 4 (see FIG. 1), and a front-side inner side brace 5 (see FIG. 2) and a rear-side inner side brace 6 (see the same figure).

Further, the vehicle side face 1 extends in a longitudinal direction and in a vertical direction, and its rear end is joined to a rear pillar 7 and its front end forms a rear edge 8r of a rear doorway (entrance) 8 of the vehicle. An upper end of the vehicle side face 1 is joined to a rear portion of a roof side rail 11 and a lower end of the vehicle side face 1 is joined to an outward end, in the vehicle width direction, of a rear frame 12.

Herein, a trim (not illustrated) to form a side wall of a baggage room provided at the vehicle-body rear portion is arranged at each of respective inward sides, in the vehicle width direction, of the side panel 2 and the wheelhouse 3, and a rear fender (not illustrated) as a vehicle-body outer plate is arranged at each of respective outward sides, in the vehicle width direction, of the side panel 2 and the wheelhouse 3.

The rear pillar 7 extends in the vertical direction at a rear portion of the side face 1. Specifically, the rear pillar 7 is a frame member having a closed-cross section 7c extending in its extension direction, and obliquely extends along a rear-gate opening 13 (see FIG. 2) such that its upper side is located on a forward side.

The roof side rail 11 is a frame member which extends in a vehicle longitudinal direction at each of both sides of a roof portion and has a closed-cross section its extending in its extension direction. As shown in FIG. 2, a rear header 14 which extends in the vehicle width direction along an upper side (a rea edge of the roof portion) of the rear-gate opening 13 at the vehicle-body rear portion is provided at the upper side of the rear-gate opening 13. The rear header 14 is also a frame member which has a closed-cross section 14s extending in its extension direction.

A corner portion C where an upper end of the rear pillar 7, a rear end of the roof side rail 11, and an outward end, in the vehicle width direction, of the rear header 14 are connected together is formed at each of both sides of an upper part of the vehicle-body rear portion.

As shown in FIG. 2, a rear seat pan 15 where a rear seat (not illustrated) is arranged and a rear floor panel 16 to form the baggage room are provided at a lower part of the vehicle-body rear portion, and a rear frame 12 extending in the vehicle longitudinal direction is provided at each of respective both sides of the rear seat panel 15 and the rear floor panel 16. Herein, a cross member 17 extending in the vehicle width direction is provided at a border between the rear seat pan 15 and the rear floor panel 16. The rear frame 12 has a closed-cross section 12s extending in the vehicle longitudinal direction.

As shown in FIG. 2, the rear frame 12 extends forwardly from a rear end of the rear floor panel 16 beyond the wheelhouse 3 at the cabin inside of the wheelhouse 3, and its front end portion is connected to a rear portion of a side sill inner 18 (not illustrated).

A damper attachment portion 19 to support an upper end portion of a rear suspension damper, not illustrated, is provided at a middle position, in the vehicle longitudinal direction, of the rear frame 12 (a position corresponding to a rear suspension, not illustrated).

A reinforcing member 20 to reinforce a surrounding area of the damper attachment portion 19 is provided at an upper portion of the rear frame 12. The reinforcing member 20, which is made of aluminum dicast or the like, is provided to extend between the upper portion of the rear frame 12 and the wheelhouse 3, covering over the surrounding area of the damper attachment portion 19.

The side panel 2 is formed in a plate shape such that it extends in the longitudinal direction and in the vertical direction at an upper portion of the side face 1 of the vehicle-body rear portion, and its rear end is joined to the rear pillar 7 and its front end forms an upper portion of the rear edge 8r of the rear doorway 8. The side panel 2 is connected to an upper end of the wheelhouse 3 at its lower end.

An opening portion 21 for a quarter window is formed at an upper-and-front portion of the side panel 2. Herein, the opening portion 21 for the quarter window is configured such that its upper side portion is formed by a rear portion of the roof side rail 11 and its front side portion is formed by a C-pillar upper inner reinforcement 9.

As shown in FIGS. 1 and 2, the wheelhouse 3 is provided below the side panel 2 of the side face 1 of the vehicle-body rear portion. The wheelhouse 3 comprises a wheelhouse inner 31 (see FIG. 2) which protrudes toward the inward side, in the vehicle width direction, (cabin inside) so as to accommodate a rear wheel (not illustrated) from above and a wheelhouse outer 32 (see FIG. 1) which protrudes toward the outward side, in the vehicle width direction (cabin outside).

As shown in FIG. 1, the wheelhouse outer 32 is integrally formed by an arch-shaped portion 33 which protrudes upwardly, in a vehicle side view, at its lower portion and an upward-protrusion portion 34 which protrudes upwardly from a rear-side part of the arch-shaped portion 33.

The arch-shaped portion 33 protrudes toward the outward side, in the vehicle width direction, beyond the upward-protrusion portion 34, and a step portion 33a which extends in the vehicle width direction is formed at an upper edge of the arch-shaped portion 33 along an arch shape of the arch-shaped portion 33.

As shown in FIG. 2, the wheelhouse inner 31 is formed substantially in the same shape, in a side view, as the wheelhouse outer 32 comprising the arch-shaped portion 33 and the upward-protrusion portion 34, and protrudes toward the cabin inside smoothly such that the step portion 33a is not provided at a border portion between two sections which respectively correspond to the arch-shaped portion 33 and the upward-protrusion portion 34.

As shown in FIGS. 1 and 2, the wheelhouse inner 31 and the wheelhouse outer 32 have flanges 31a, 32a which are formed at their respective upper-edge sides. The side panel 2 is joined to the wheelhouse 3 such that its lower end 2e (see FIG. 4) is interposed between the flanges 31a, 32a of the wheelhouse inner 31 and the wheelhouse outer 32.

As shown in FIG. 1, the C pillar reinforcement 4 is a frame member which is provided on the outward side, in the vehicle width direction, of the side panel 2 and extends upwardly from a pint of the step portion 33a of the arch-shaped portion 33 of the wheelhouse outer 32 which is positioned on a slightly-forward side of a top of the step portion 33a.

Figure 7:
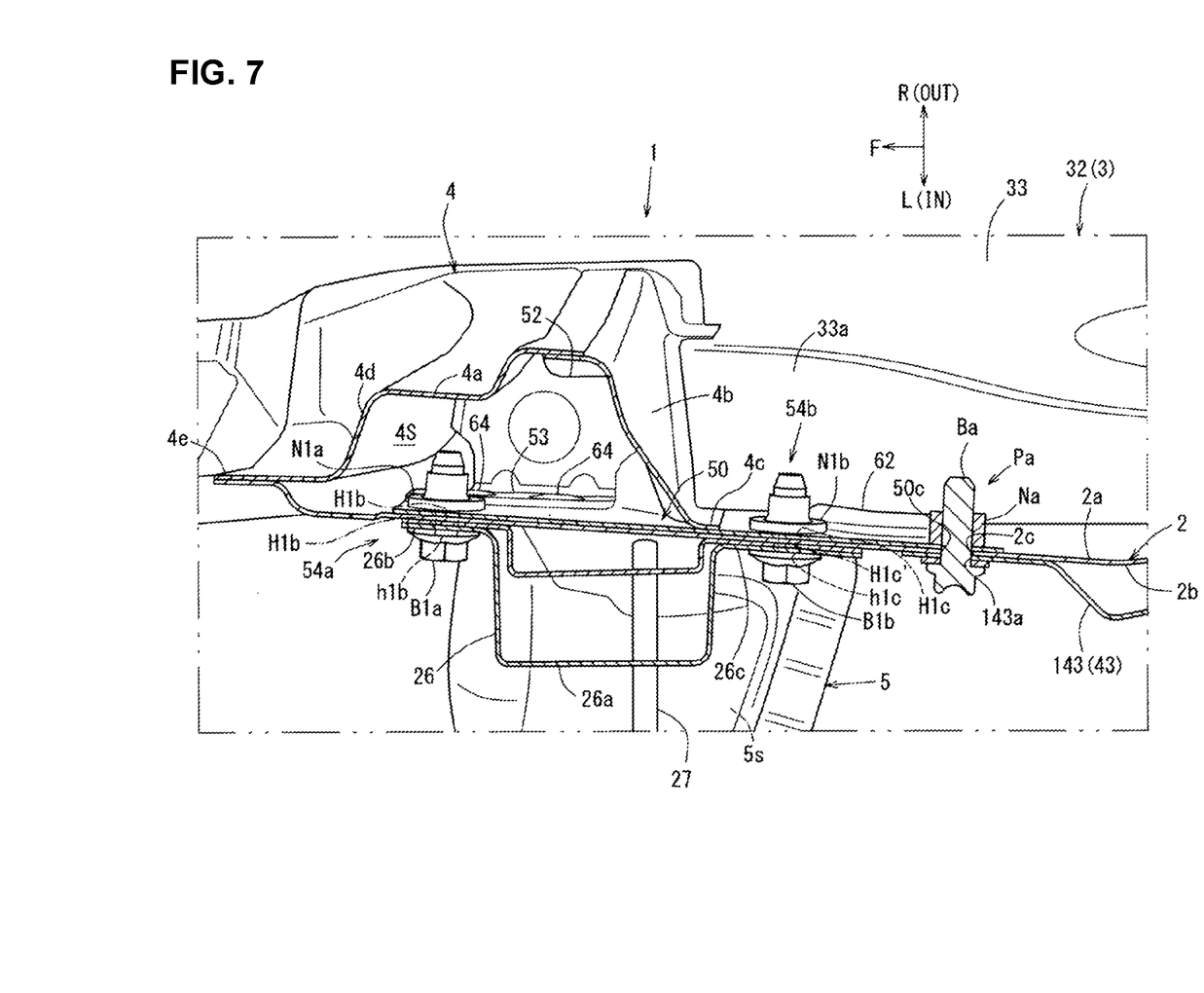
FIG. 7 is a sectional view take along line B-B of FIG. 3.

As shown in FIGS. 1 and 7, an upper portion of the C pillar reinforcement 4 extends in the vertical direction along an upper portion of the rear edge 8r of the rear doorway 8 of the vehicle and a front edge of the opening portion 21 for the quarter window. The C pillar reinforcement 4 is formed in a hat shape such that its horizontal cross section (a cross section perpendicular to its extension direction) is opened inwardly, in the vehicle width direction, as shown in FIG. 7.

Figure 3:
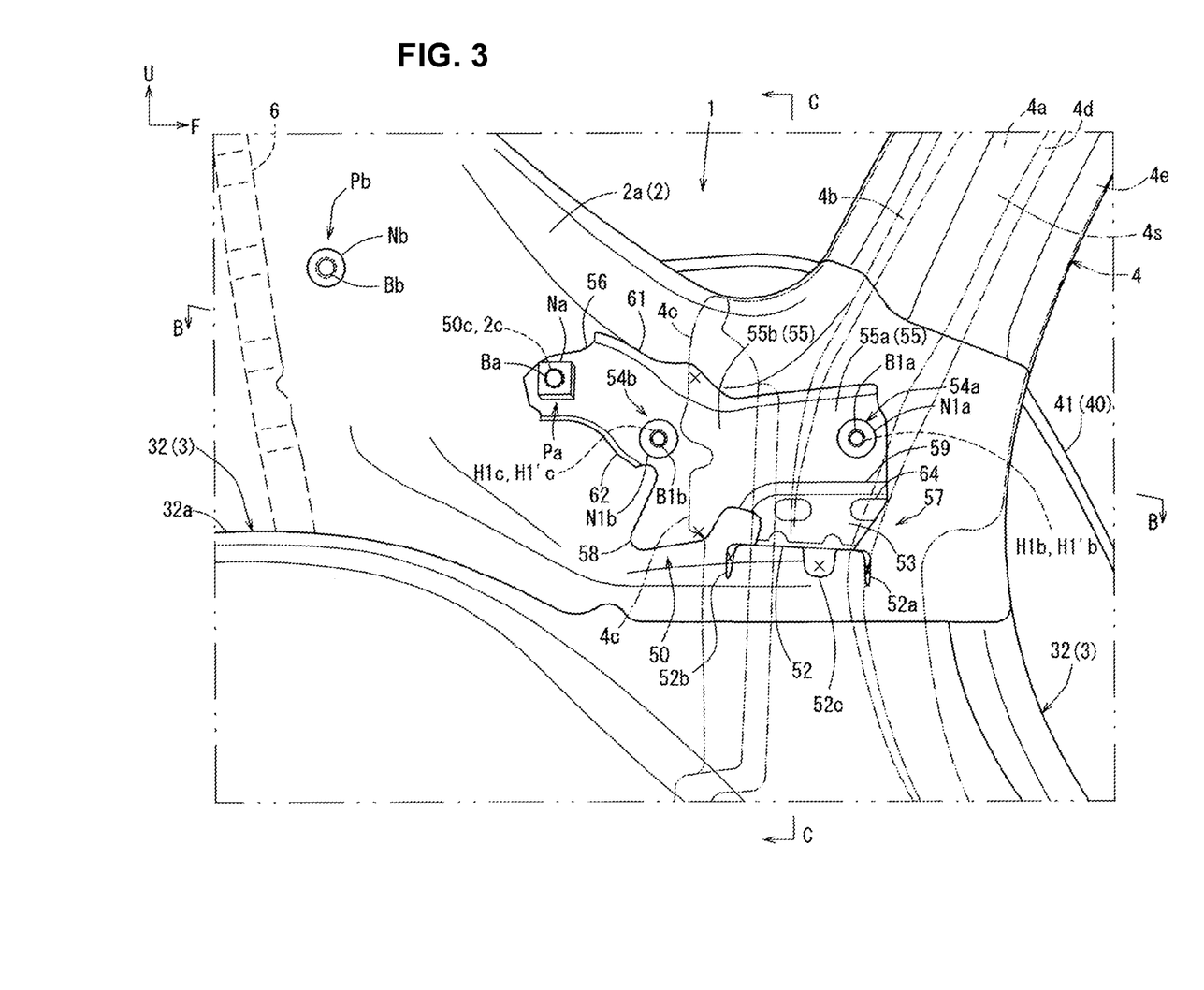
FIG. 3 is an enlarged view of an area X1 of FIG. 1, in which a C pillar is illustrated by an imaginary line.

Specifically, as shown in FIGS. 3 and 7, the C pillar reinforcement 4 has a rear-side flange 4c to protrude rearwardly along a rear edge of a rear wall 4b and a front-side flange 4e to protrude forwardly along a front edge of a front wall 4d, and these flanges 4c, 4e are joined to an outer face 2a of the side panel 2. Thereby, the C pillar reinforcement 4 has a closed-cross section 4s which is formed together with the side panel 2.

As shown in FIG. 1, the C pillar reinforcement 4 is configured such that its upper portion is joined to a rear portion of the roof side rail 11 from below and its lower portion is connected to a rear portion of the side sill inner 18 via a gusset 22 which is provided along a front-side part of the arch-shaped step portion 33a (upper edge side portion). As shown in FIG. 2, the front-side inner side brace 5 and the rear-side inner side brace 6 are provided on the cabin outside of the side panel 2 and the wheelhouse inner 31, respectively. The front-side inner side brace 5 extends upwardly from a front-side vicinity point of the damper attachment portion 19 as the rear-suspension attachment portion on the cabin inside of the vehicle-body rear portion. Meanwhile, the rear-side inner side brace 6 extends upwardly from a rear-side vicinity point of the damper attachment portion 19 on the cabin inside of the vehicle-body rear portion. Each of these braces 5, 6 is reinforced by the reinforcing member 20.

The front-side and rear-side inner side braces 5, 6 extend upwardly from the reinforcing member 20, which will be described later specifically, up to the side panel 2, straddling the wheelhouse inner 31, and are formed in an outwardly-opened hat shape, respectively. Consequently, these braces 5, 6 form closed-cross sections 5s, 6s in cooperation with the wheelhouse inner 31 and the side panel 2, respectively.

The front-side inner side brace 5 extends such that its upper portion is inclined forwardly up to a point corresponding to the C pillar reinforcement 4 (see FIG. 1) which is positioned on the outward side, in the vehicle width direction, of the side panel 2 in the vehicle side view. An upper end portion of the rear-side inner side brace 6 is joined to an upper portion of the rear pillar 7, specifically to the corner portion C where an outward end portion, in the vehicle width direction, of the rear header 14 and an upper portion of the rear pillar 7 are connected.

Further, as shown in FIG. 3, a reinforcing member 50 to reinforce the side panel 2 is attached to the side panel 2 from the outward side, in the vehicle width direction, of the side panel 2. This reinforcing member 50 will be described later specifically.

Figure 6:
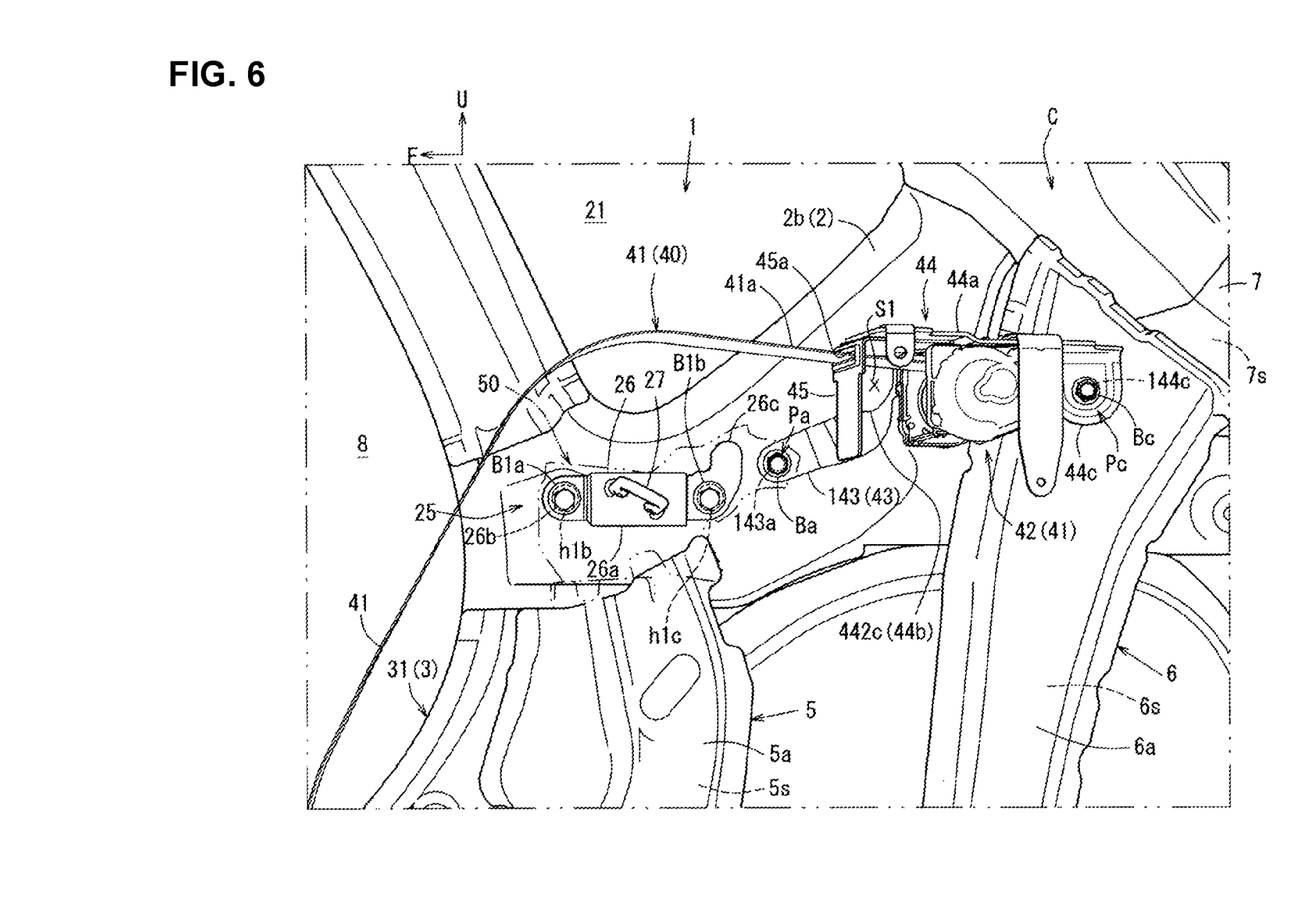
FIG. 6 is an enlarged view of an area X3 of FIG. 2.

Moreover, as shown in FIG. 2, a striker 25 is attached to the side face 1 of the vehicle-body rear portion from the cabin outside. As shown in FIGS. 6 and 7, the striker 25 is a member to lock a seatback (not illustrated) of a rear seat (not illustrated) in its standing state, which comprises a base portion 26 and a body portion 27 (see FIG. 6) which protrudes toward the cabin inside in a roughly U shape.

The base portion 26 is formed in a hat shape such that its cross section perpendicular to the vertical direction is opened toward the cabin outside, which comprises a gate-shaped base-portion body 26a which is configured to be opened toward the cabin outside, a front-side flange 26b which protrudes forwardly from a front end of the base-portion body 26a, and a rear-side flange 26c which protrudes rearwardly from a rear end of the base-portion body 26a.

As shown in FIGS. 1 and 6, the striker 25 is provided at a position of the side face 1 of the vehicle-body rear portion which is located in front of and above a retractor 42 described later, in other words, at a position slightly above an upper end of the front-side inner side brace 5, such that the front-side and rear-side flanges 26b, 26c provided at the base portion 26 are attached to the side panel 2 and the reinforcing member 50 (see FIG. 6) which is provided on the outward side, in the vehicle width direction, of the side panel 2 from the cabin inside.

Specifically, as shown in FIGS. 6 and 7, bolt insertion holes h1b, h1c where bolts B1a, B1b are to be inserted are formed at the front-side and rear-side flanges 26b, 26c of the base portion 26 of the striker 25.

Meanwhile, as shown in FIGS. 3 and 7, bolt insertion holes H1b', H1c' are formed at respective portions of the side panel 2 of the vehicle-body rear portion which correspond to the bolt insertion holes h1b, h1c of the front-side and rear-side flanges 26b, 26c of the striker 25 in the vehicle side view.

Further, bolt insertion holes H1b, H1c are formed at respective portions of the reinforcing member 50 of the vehicle-body rear portion which correspond to the bolt insertion holes h1b, h1c of the front-side and rear-side flanges 26b, 26c of the striker 25 in the vehicle side view.

Moreover, a weld nut Nia as a front-side striker attachment portion is welded to a peripheral edge of the front-side bolt insertion hole H1b of the reinforcing member 50. The bolt B1a is inserted into the bolt insertion holes h1b, H1b', H1b of the front-side flange 26b of the striker 25, the side panel 2 and the reinforcing member 50, and then fastened to the weld nut Nia.

Likewise, a weld nut Nib as a rear-side striker attachment portion is welded to a peripheral edge of the rear-side bolt insertion hole H1c of the reinforcing member 50. The bolt Bib is inserted into the bolt insertion holes h1c, H1c', H1c of the rear-side flange 26c of the striker 25, the side panel 2 and the reinforcing member 50, and then fastened to the weld nut Nib.

That is, three of the base portion 26, the side panel 2, and the reinforcing member 50 are fastened together, respectively, by the bolt B1a and the weld nut Nia at the front-side flange 26b and by the bolt Bib and the weld nut Nib at the rear-side flange 26c.

Further, as shown in FIG. 2, a seatbelt device 40 for the vehicle is provided at the rear seat (not illustrated). The seatbelt device 40 comprises a lengthy seatbelt 41 to restrain an occupant (passenger) seated in the rear seat and the retractor 42 to pull out and wind the seatbelt 41.

Figure 4:
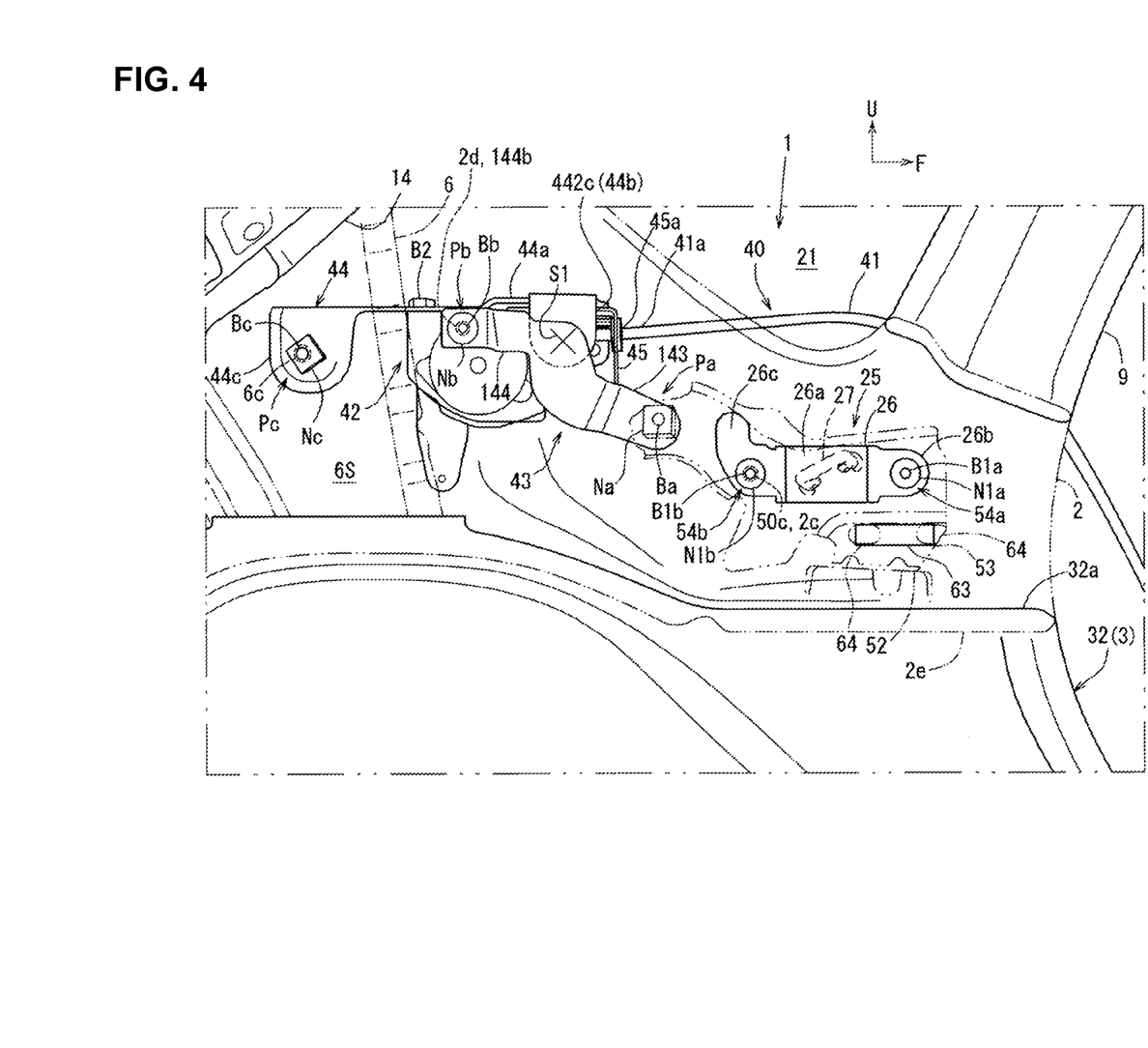
FIG. 4 is an enlarged view of the area X1 of FIG. 1, in which the C pillar is removed and a side panel is illustrated by the imaginary line.

As shown in FIG. 4, the retractor 42 is attached to the side face 1 of the vehicle-body rear portion at plural retractor-attachment positions Pa, Pb, Pc which are spaced apart from each other in the longitudinal direction via plural brackets 43, 44. In the present embodiment, as shown in FIG. 4, these retractor-attachment positions Pa, Pb, Pc are arranged such that the front-side retractor-attachment position Pa is located on a forward side of a position of a gravity center G (see FIG. 5) of the retractor 42, the middle-side retractor-attachment position Pb is located at a position substantially corresponding to the position of the gravity center G of the retractor 42 in the longitudinal direction, and the rear-side retractor-attachment position Pc is located on a rearward side of the position of the gravity center G of the retractor 42.

Figure 5:
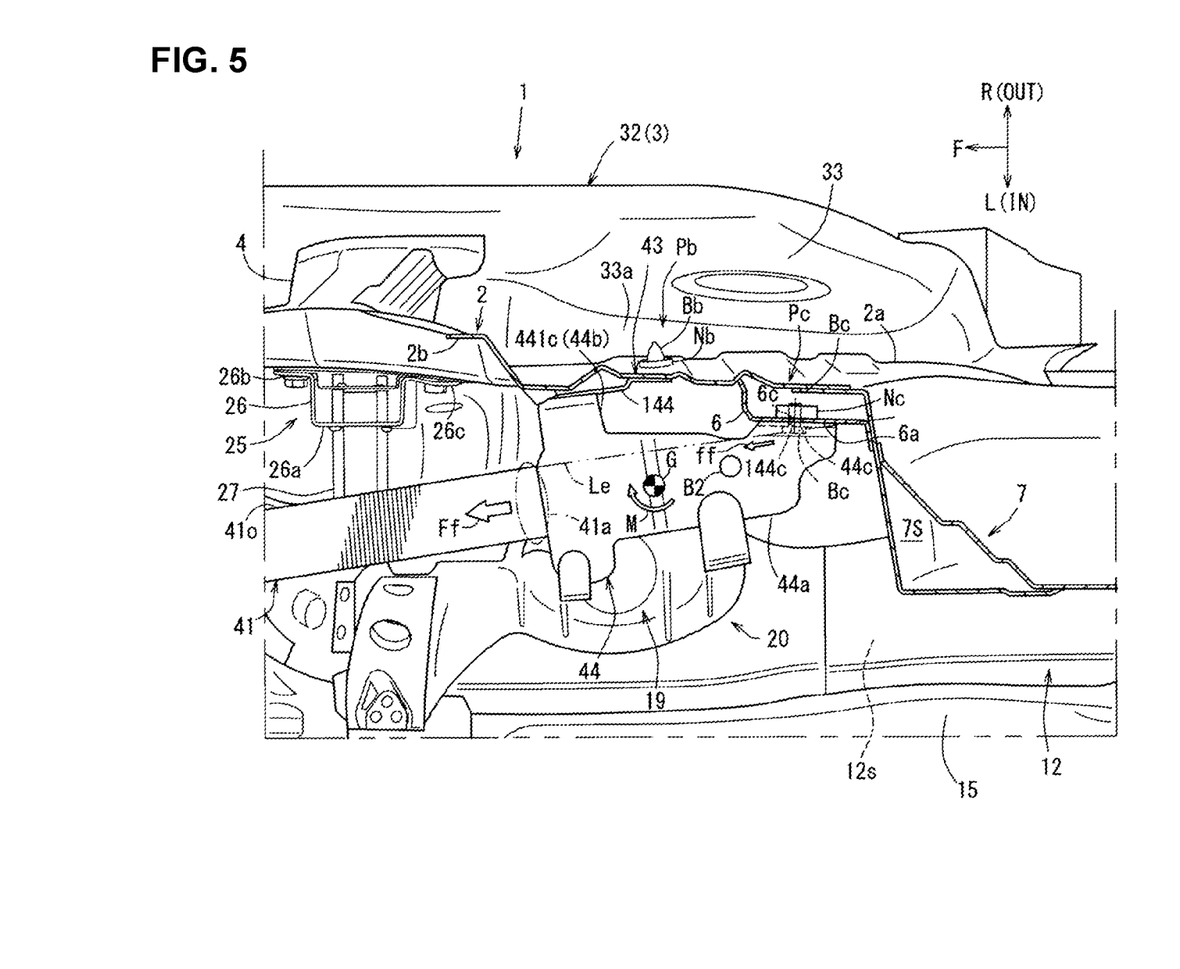
FIG. 5 is a sectional view take along line A-A of FIG. 2.

Mainly, as shown in FIGS. 4-6, the brackets 43, 44 comprises the front-side bracket 43 and the rear-side bracket 44. The rear-side bracket 44 comprises a flat-plate shaped body portion 44a which extends roughly horizontally so as to cover over a substantially entire part of the retractor 42, and attaches the retractor 42 from above via a bolt B2 extending in the vertical direction (see FIGS. 4 and 5) or the like at a central portion, in a plan view, of the body portion 44a.

Figure 8:
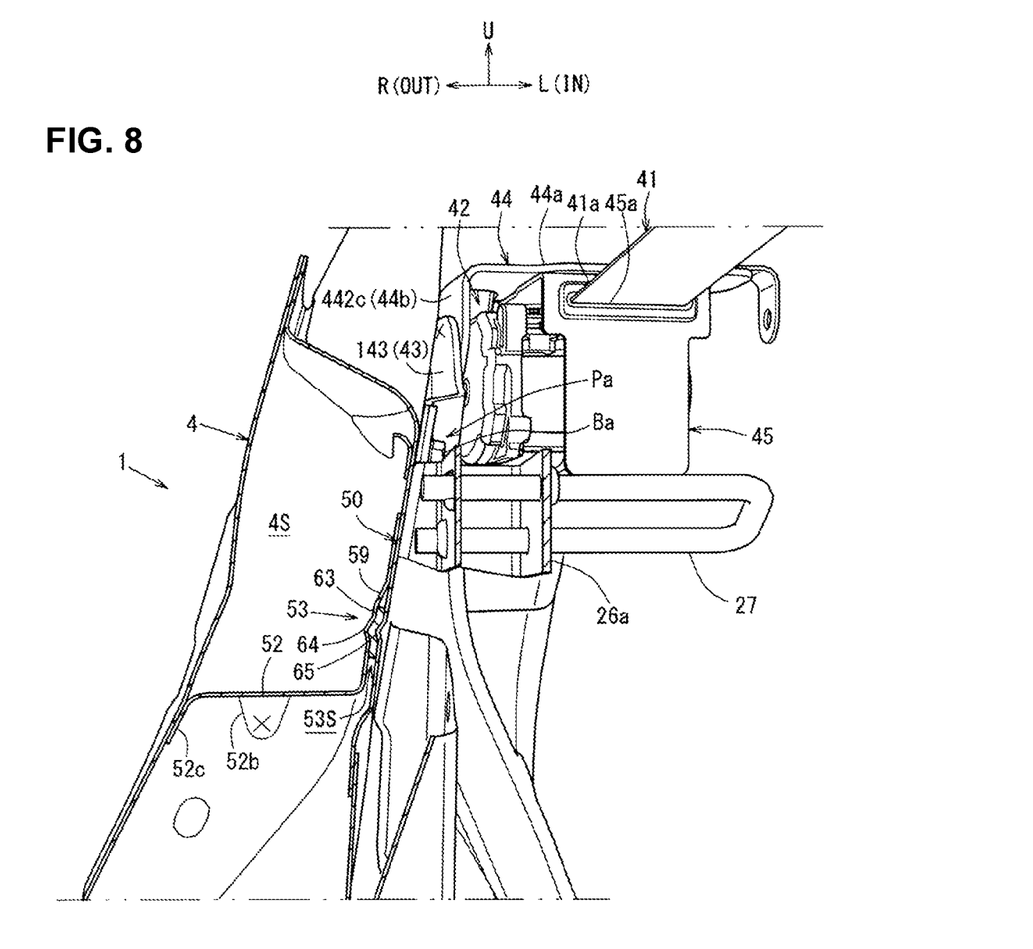
FIG. 8 is a sectional view take along line C-C of FIG. 3.

As shown in FIGS. 6 and 8, the retractor 42 is provided with a guide member 45 at its front side, which has a guide portion 45a to guide the seatbelt 41 extending forwardly from the retractor 42. This guide member 45 is provided to face the retractor 42 from the forward side, and its upper end is attached to a front end of the rear-side bracket 44.

In the present embodiment, as shown in FIGS. 4-6, an extension portion 41a which extends forwardly from the retractor 42 of the seatbelt 41 means the extension portion 41a which extends forwardly from the guide portion 45a of the seatbelt 41. Hereafter, the extension portion 41a extending forwardly from the retractor 42 of the seatbelt 41 will be referred to as the belt forward-extension portion 41a.

As shown in FIG. 5, the seatbelt 41 is formed in a belt shape such that it has a specified length (width) in a direction perpendicular to its extension direction, and the seatbelt 41 extends forwardly such that it has a width in the vehicle width direction at the belt forward-extension portion 41a.

As shown in FIG. 5, the retractor 42 is fixed to the side face 1 of the vehicle-body rear portion in a cantilever state from the cabin inside such that its front side is directed slightly toward the inward side, in the vehicle width direction, and its rear side is directed slightly toward the outward side, in the vehicle width direction. Thereby, the belt forward-extension portion 41a extends slightly obliquely, in the plan view, relative to a direction which matches the vehicle forward side such that its front side is located on the inward side, in the vehicle width direction.

As shown in FIGS. 4-6, the rear-side bracket 44 has a front-side flange 44b which is formed at a forward-and-outward edge, in the vehicle width direction, of the body portion 44a and a rear-side flange 44c which is formed at a rearward-and-outward edge, in the vehicle width direction, of the body portion 44a.

The rear-side flange 44c of the rear-side bracket 44 is formed in a bent shape such that it protrudes downwardly from an outward edge, in the vehicle width direction, of the body portion 44a, and attached to the rear-side retractor-attachment position Pc of an inward face 6a, in the vehicle width direction, of the rear-side inner side brace 6.

Specifically, as shown in FIGS. 5 and 6, a bolt insertion hole 144c where a bolt Bc as a rear-side vehicle-body attachment portion is inserted is formed at the rear-side flange 44c of the rear-side bracket 44.

Meanwhile, as shown in FIGS. 4 and 5, a bolt insertion hole 6c is formed at a portion of the inward face 6a, in the vehicle width direction, of the rear-side inner side brace 6 which corresponds to the bolt insertion hole 144c in the vehicle side view (i.e., the rear-side retractor-attachment position Pc), and a weld nut Nc as the rear-side retractor-attachment portion is welded to a peripheral edge of the bolt insertion hole 6c from the outward side, in the vehicle width direction (an inside of the closed-cross section 6s of the rear-side inner side brace 6).

The bolt Bc as the rear-side vehicle-body attachment portion is inserted into the bolt insertion holes 144c, 6c of the rear-side flange 44c of the rear-side bracket 44 and the inward face 6a, in the vehicle width direction, of the rear-side inner side brace 6, and then fastened to the weld nut Nc. Thereby, the rear-side bracket 44 is attached such that the rear-side flange 44c is attached to the inward face 6a, in the vehicle width direction, of the rear-side inner side brace 6 by the rear-side attachment portion (the rear-side vehicle-body attachment portion (Bc) and the rear-side retractor attachment portion (Nc)).

That is, the retractor 42 is attached, at the rear-side retractor-attachment position Pc, to the inward face 6a, in the vehicle width direction, of the rear-side inner side brace 6 which protrudes toward the inward side, in the vehicle width direction, relative to the side panel 2 via the rear-side bracket 44.

Thereby, as shown in FIG. 5, there is provided a structure in which when a forward tension load Ff is inputted to the retractor 42, a load element ff in a shearing direction regarding the load applied to the rear-side attachment portion (Bc, Nc) is increased.

Further, in the present embodiment, the inward face 6a, in the vehicle width direction, of the rears-ide inner side brace 6 is arranged on an extension line Le which straightly extends rearwardly, in a longitudinal direction of the seatbelt 41, from the belt forward-extension portion 41a (specifically, an outward end 41o, in the vehicle width direction, of the belt forward-extension portion 41a) in the vehicle plan view. Herein, in the present embodiment, the inward face 6a is configured to extend in parallel to the extension line Le in the vehicle plan view (see FIG. 5).

The inward face 6a of the present embodiment is spaced, toward the inward side in the vehicle width direction, from the side panel 2 for the above-described arrangement, so that when the forward tension load Ff is inputted to the retractor 42, the load element ff in the shearing direction applied to the rear-side attachment portion (Bc, Nc) is increased further.

Further, the position of the gravity center G of the retractor 42 is located on the extension line Le of the belt forward-extension portion 41a or close to this line Le in the plan view (see FIG. 5). That is, it is preferable that the outward end 41c, in the width direction, of the belt forward-extension portion 41a, the position of the gravity center G of the retractor 42 and the inward face 6a be arranged substantially straightly along the extension line Le.

As shown in FIGS. 4-6, the front-side flange 44b of the rear-side bracket 44 is formed integrally by a horizontal projection portion 441c (see FIG. 5) which horizontally protrudes outwardly, in the vehicle width direction, from an outward edge, in the vehicle width direction, of the body portion 44a and a downward projection portion 442c (see FIGS. 4 and 6) which protrudes downwardly, in the vehicle width direction, from an outward edge, in the vehicle width direction, of the horizontal protrusion portion 441c. As shown in FIG. 5, the horizontal protrusion portion 441c protrudes outwardly, in the vehicle width direction, from the outward edge, in the vehicle width direction, of the body portion 44a by length which substantially corresponds to the projection length, in the vehicle width direction, of the rear-side inner side brace 6 relative to the side panel 2.

The above-described front-side bracket 43 extends in the longitudinal direction, a middle portion, in the longitudinal direction, of which is joined to the front-side flange 44b of the rear-side bracket 44 by spot welding or the like (see a welding point s1 shown in FIGS. 4 and 5). A mark "X" in the figures shows the point of the spot welding. Thereby, the front-side bracket 43 and the rear-side bracket 44 are integrally attached and fixed together.

The front-side bracket 43 comprises a forward protrusion portion 143 (see FIGS. 4 and 6) which protrudes forwardly relative to a middle portion, in the longitudinal direction, thereof and a rearward protrusion portion 144 (see FIGS. 4 and 5) which protrudes rearwardly relative to its middle portion.

As shown in FIGS. 4 and 6, a front-end side portion of the forward extension portion 143 extends forwardly up to the front-side retractor attachment position Pa of the retractor 42 to the side face 1 of the vehicle-body rear portion, and as shown in FIG. 6, a bolt insertion hole 143a where a bolt Ba as a front-side vehicle-body attachment portion is inserted is formed at this front-end side portion of the forward extension portion 143.

Herein, as shown in FIG. 3, the front-side retractor attachment position Pa is located at a point of the side face 1 of the vehicle-body rear portion which is positioned on a rearward side of the C pillar reinforcement 4 (a gusset portion 52) and the rear-side striker attachment portion (N1b).

Further, the front-side retractor attachment position Pa is located at a lower level than a lower end of the retractor 42 as shown in FIG. 6 and at an upper level than the gusset portion 52 and a vibration-damping joint portion 53 (specifically, at a slightly-upper level than the striker attachment portions (N1a, N1b)) as shown in FIG. 3.

Meanwhile, the reinforcing member 50 is provided at the front-side retractor attachment position Pa and its surrounding area of the side panel 2 from the cabin outside. A front-end side portion of the forward extension portion 143 described later specifically is attached to the reinforcing member 50 and the side panel 2 at the front-side retractor attachment position Pa (aww FIGS. 4 and 6).

As shown in FIGS. 4 and 5, a rear-end side portion of the rearward extension portion 144 of the front-side bracket 43 extends rearwardly up to the middle-side retractor attachment position Pb of the retractor 42 to the side face 1 of the vehicle-body rear portion, and a bolt insertion hole 144b where a bolt Bb as a middle-side vehicle-body attachment portion is inserted is formed at this rear-end side portion of the rearward extension portion 144 (see FIG. 4).

As shown in FIG. 4, a bolt insertion hole 2d is formed at a point of the side panel 2 which corresponds to the middle-side retractor attachment position Pb so as to penetrate this point of the side panel 2 in the vehicle width direction, and a weld nut Nb as a middle-side retractor attachment portion is welded to a peripheral edge of the bolt insertion hole 2d from the outward side, in the vehicle width direction.

The bolt Bb as the middle-side vehicle-body attachment portion is inserted into the respective bolt insertion holes 144b, 2c of the reward extension portion 144 of the front-side bracket 43 and the side panel 2 from the inward side, in the vehicle width direction, and fastened to the weld nut Nb. Thereby, the front-side bracket 43 is attached such that the rear-end side portion of the rearward extension portion 144 is attached to the side panel 2 by a middle-side attachment portion (middle-side vehicle-body attachment portion (Bb) and the middle-side retractor attachment portion (Nb)).

As shown in FIGS. 1 and 3, the reinforcing member 50 is attached and fixed to an area of the side panel 2 which is positioned from a point corresponding to the C pillar reinforcement 4 (closed-cross section 4s) to a point located on the rearward side of the C pillar reinforcement 4 in the vehicle side view from an outer face (an outward face, in the vehicle width direction) of the side panel 2 at plural points by the spot welding or the like (see the mark "X" shown in FIG. 4).

That is, as shown in FIG. 3, the rear-side flange 4c of the C pillar 4 extends in the vertical direction on the outward side, in the vehicle width direction, of the reinforcing member 50 such that it extends across the reinforcing member 50 extending in the longitudinal direction. This reinforcing member 50 is spot-welded such that its overlapping portion with the rear-side flange 4c vertically crossing the reinforcing member 50 is interposed between the rear-side flange 4c of the C pillar reinforcement 4 and the side panel 2 in the vehicle width direction.

Figure 9:
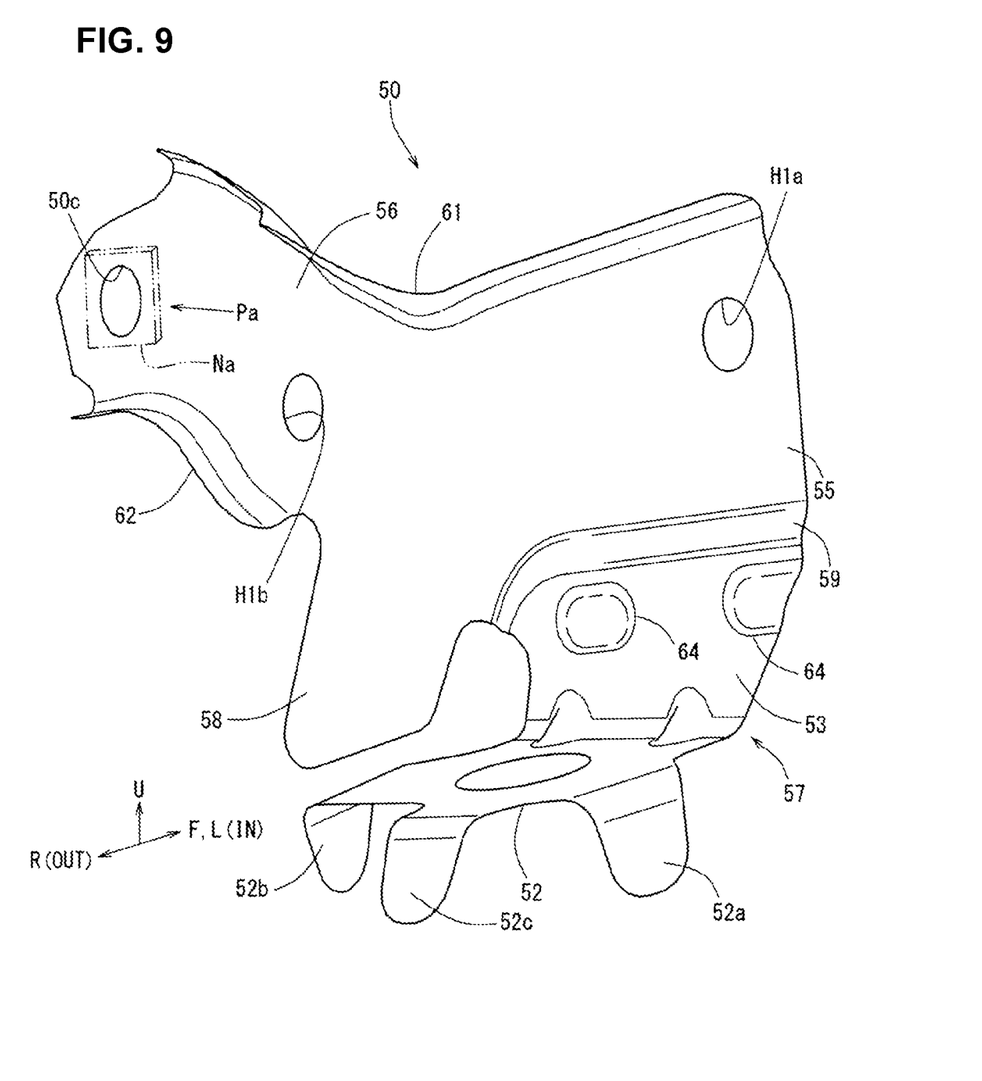
FIG. 9 is a perspective view of a reinforcing member fixed to the side panel, when viewed from the cabin outside, a rearward side, and a downward side.

As shown in FIGS. 3 and 9, the reinforcing member 50 comprises a base portion 55, a rearward extension portion 56 extending rearwardly from a rear end of the base portion 55, a front-side downward extension portion 57 extending downwardly from a front-side lower edge of the base portion 55, and a rear-side downward extension portion 58 extending downwardly from a rear-side lower edge of the base portion 55.

The rearward extension portion 56 of the reinforcing member 50 extends rearwardly from the base portion 55 so as to reach the front-side retractor attachment position Pa, and a bolt insertion hole 50c is formed at a rear-end side portion (front-side retractor attachment position Pa) of the rearward extension portion 56 so as to penetrate this rear-end side portion in the vehicle width direction (its plate-thickness direction).

Further, as shown in FIGS. 3, 4 and 7, a weld nut Na as a front-side retractor attachment portion is welded to a peripheral edge of the bolt insertion hole 50c of the rearward extension portion 56 from the outward side, in the vehicle width direction. Herein, the bolt insertion hole 2c is formed at the front-side retractor attachment position Pa of the side panel 2 so as to penetrate this position Pa of the side panel 2 in the vehicle width direction (plate-thickness direction) (see FIG. 7).

As shown in FIGS. 3, 4, 6 and 7, the bolt Ba as the front-side vehicle-body attachment portion is inserted into the respective bolt insertion holes 143a, 2c, 50c of the forward extension portion 143 of the front-side bracket 43, the side panel 2 and the reinforcing member 50 at the front-side retractor attachment position Pa from the inward side, in the vehicle width direction, and fastened to the weld nut Na. Thereby, the forward extension portion 143 of the front-side bracket 43 is attached such that its front-end side portion is attached to the side panel 2 and the reinforcing member 50 by a front-side attachment portion (front-side vehicle-body attachment portion (Ba) and the front-side retractor attachment portion (Na)).

That is, the retractor 42 is attached, at the front-side retractor-attachment position Pa, to the side panel 3 and the reinforcing member 50 via the rear-side bracket 44 and the front-side bracket 43.

Further, as shown in FIGS. 3 and 7, weld nuts N1a, N1b as two striker attachment portions spaced apart from each other in the longitudinal direction are fixed to the reinforcing member 50. Specifically, the font-side positioned striker attachment portion (N1a) (front-side striker attachment portion (Nia)) of the two striker attachment portions (Nia, Nib) is fixed to a front portion of the base portion 55 of the reinforcing member 50, and the rear-side positioned striker attachment portion (N1b) (rear-side striker attachment portion (N1b)) is fixed to a front portion of the rearward extension portion 56. Thereby, the reinforcing member 50 also serves as a striker reinforcing member to reinforce an attachment portion of the striker 25 to the side panel 2.

Herein, for example, in a case where a baggage (not illustrated) put in a baggage room slides forward and hits against a rear seat (not illustrated) because of the inertia of the baggage in the vehicle collision, a load is applied toward the outward side, in the vehicle width direction, is inputted to the front-side and rear-side striker attachment portions (Nia, Nib). However, since the reinforcing member 50 is provided with the gusset portion 52, this gusset portion 52 is stretched against the above-described load inputted from the striker attachment portions (Nia, Nib), so that the reinforcing member 50 can firmly support this load.

Further, since the base portion 26 of the striker 25 is attached, by the bolts B1a, B1b, to the reinforcing member 50 across the front-side striker attachment portion (N1a) positioned inside the closed-cross section 4s of the C pillar reinforcement 4 and the rear-side striker attachment portion (N1b) positioned on the rearward side of the C pillar reinforcement 4 in the vehicle side view, the rigidity of the reinforcing member 50 can be increased even for an area of the reinforcing member 50 which reaches the rearward portion of the C pillar reinforcement 4. That is, the base portion 26 of the striker 25 also serves as a high-rigidity portion to suppress the reinforcing member 50 from being deformed such that the front-side retractor attachment portion (Na) moves toward the outward side, in the vehicle width direction, in the collision mode in which the seatbelt 41 gets locked.

As shown in FIG. 3, at an upper edge of the reinforcing member 50 (extending over a range from the rearward extension portion 56 and the base portion 55) is formed an upper-edge flange 61 which extends along the above-described upper edge and protrudes outwardly, in the vehicle width direction. Meanwhile, at a lower edge of the rearward extension portion 56 of the reinforcing member 50 is formed a lower-edge flange 62 which extends along the above-described lower edge and protrudes outwardly, in the vehicle width direction.

These flanges 61, 62 respectively extend in the longitudinal direction between the front-side retractor attachment position Pa and the gusset portion 52 provided on the rearward side of the front-side retractor attachment position Pa. Thereby, these flanges 61, 62 also serve as the high-rigidity portion to suppress the reinforcing member 50 from being deformed such that the front-side retractor attachment portion (Na) moves toward the outward side, in the vehicle width direction, in the collision mode in which the seatbelt 41 gets locked.

Moreover, as shown in FIGS. 3 and 7-9, the front-side downward extension portion 57 is provided with the vibration-damping joint portion 53 and the gusset portion 52 which is bent outwardly, in the vehicle width direction, from a lower end of the vibration-damping joint portion 53. A step portion 59 is formed at a border between the vibration-damping joint portion 53 and a front-side portion of the base portion 55. The vibration-damping joint portion 53 is configured to be offset toward the outward side, in the vehicle width direction, from the base portion 55 via the step portion 59.

Thereby, as shown in FIG. 8, a slight gap 53s is formed between the vibration-damping joint portion 53 and the outer face 2a of the side panel 2 in a state where the reinforcing member 50 is attached to the side panel 2. That is, the vibration-damping joint portion 53 is joined to the side panel 2 via a vibration damping material 63 (see FIGS. 4 and 8) which is provided in the gap 53s.

The vibration-damping joint portion 53, which is formed in a flat-plate shape as a whole, is provided with a pair of beads 64 which are arranged at both sides of a middle position, in the longitudinal direction, thereof in the vehicle side view. Each of the beads 64 is configured to partially protrude toward the outward side, in the vehicle width direction, of the vibration-damping joint portion 53 so as to engage with the vibration-damping material 63 and extend in the longitudinal direction.

These beads 64 also serve as the high-rigidity portion to suppress the reinforcing member 50 from being deformed such that the front-side retractor attachment portion (Na) moves toward the outward side, in the vehicle width direction, in the collision mode in which the seatbelt 41 gets locked.

Further, as shown in FIG. 8, a pair of beads 65 are provided at respective portions of the side panel 2 which inwardly face the pair of beads 64 as well. Each of these beads 65 is, similarly to the bead 64, configured to partially protrude toward the outward side, in the vehicle width direction, of the side panel 2 so as to engage with the vibration-damping material 63 and extend in the longitudinal direction.

It is preferable that the vibration-damping material 63 be made of thermosetting resin. Since the vibration-damping material 63 is made of the thermosetting resin in the present embodiment, the vibration-damping material 63 can be integrated with the vibration-damping joint portion 53 and the side panel 2 by applying the vibration-damping material 63 as an adhesive agent into the gap 53s between the vibration-damping joint portion 53 and the side panel 2 before painting/drying processes in a vehicle-body manufacturing and then thermosetting the vibration-damping material 63 in the painting/drying processes.

As described above, the vibration-damping material 63 is applied so that it can be introduced into the inside of the beads 64 provided at the vibration-damping joint portion 53 before the painting/drying processes in the vehicle-body manufacturing. Thereby, the beads 64, 65 respectively provided at the vibration-damping joint portion 53 and the side panel 2 engage with the vibration-damping material 63. Accordingly, the vibration-damping material 63 can be remained at an appropriate position without dropping down from the gap 53s until the painting/drying processes are executed after the vibration-damping material 63 is applied (until the vibration-damping material 63 is thermoset) or during the painting/drying processes.

Moreover, another part of the reinforcing member 50 than the gusset portion 52 is formed by a vertical-wall-shaped flat plate to be joined to the outer face 2a of the side panel 2. The gusset portion 52 is provided at a front-side lower end of the reinforcing member 50 (at a lower level than the vibration-damping joint portion 53), and this gusset portion 52 is formed integrally with the above-described vertical-wall-shaped other part of the reinforcing member 50 by being bent at a roughly right angle toward the outward side, in the vehicle width direction, relative to the vertical-wall-shaped other part of the reinforcing member 50 such that it extends substantially horizontally.

As shown in FIGS. 7 and 8, the gusset portion 52 is configured to be of a substantially horizontal-face shape, having substantially the same shape and size as a cross section perpendicular to the vertical direction of the closed-cross section 4s of the C pillar reinforcement 4, which partitions the closed-cross section 4s of the C pillar reinforcement 4 vertically. As shown in FIGS. 3 and 9, the gusset portion 52 is configured such that flanges 52a, 52b, 52c protrude downwardly from a front edge, a rear edge, and an outward edge, in the vehicle width direction, thereof, respectively.

The flange protruding from the front edge of the gusset portion 52 (front-edge flange 52a) is joined to the front wall 4d of the C pillar 4, the flange protruding from the rear edge of the gusset portion 52 (rear-edge flange 52b) is joined to the rear wall 4b of the C pillar 4, and the flange protruding from the outward-side edge of the gusset portion 52 (outward-edge flange 52c) is joined to an outward wall 4a, in the vehicle width direction, of the C pillar 4. These joining are respectively conducted by the spot welding (see spots shown by the mark "X" in FIG. 3).

The reinforcing member 50 has, as described above, the front-side retractor attachment portion (Na), the gusset portion 52, the vibration-damping joint portion 53, and the striker attachment portions (N1a, N1b) (see FIG. 3), and this reinforcing member 50 is formed integrally by a single plate (a sheet of metal plate) which is configured to be continuous over a range of the front-side retractor attachment portion 51, the gusset portion 52, the vibration-damping joint portion 53, and the striker attachment portions (N1a, N1b) (see FIG. 9).

The side vehicle-body structure of the vehicle of the above-described present embodiment comprises the rear suspension (not illustrated) suspending the rear wheel, the side panel 2 constituting the side face 1 of the vehicle at the higher level than the damper attachment portion 19 as the attachment portion to attach the rear suspension to the vehicle body as shown in FIG. 2, the retractor 42 fixed to the cabin-inside face 2b of the side panel 2, the C pillar reinforcement 4 as the frame member forming the closed-cross section 4s extending vertically in corporation with the side panel 2 as shown in FIG. 1, and the reinforcing member 50 fixed to the side panel 2 as shown in FIGS. 1 and 3, wherein the reinforcing member 50 comprises, as shown in FIGS. 1, 3, 4 and 7, the front-side retractor attachment portion (Na) to attach the retractor 42 as shown in FIGS. 1, 3, 4 and 7, the gusset portion 52 to partition the closed-cross section 4s of the C pillar reinforcement 4 vertically as shown in FIGS. 3, 5, 8 and 9, and the vibration-damping joint portion 53 joined to the side panel 2 via the vibration-damping material 63 as shown in FIGS. 4 and 8, and the reinforcing member 50 is formed integrally by the member which is configured to be continuous over the range of the front-side retractor attachment portion (Na), the gusset portion 52 and the vibration-damping joint portion 53.

According to the present invention, since when the vibration caused by the road-surface input from the rear suspension (the vibration inputted to the vehicle via the rear suspension from the rear wheel during the vehicle traveling) is transmitted to the reinforcing member 50, this vibration is damped by the vibration-damping joint portion 53, the vibration transmitted to the retractor 42 is so reduced that the vertical vibration of the retractor 42 can be suppressed.

Thereby, while the retractor 42 is located close to ears of the occupant seated in the rear seat, a noise which may be caused by vibration of an internal device, such as a sensor, provided inside the retractor 42 can be properly suppressed from being generated.

Further, since the gusset portion 52 supports the input load to the retractor 42 from the seatbelt 41 in the collision mode in which the seatbelt 41 gets locked inside the closed-cross section 4s of the C pillar reinforcement 4, the deformation of the front-side retractor attachment portion (Na) can be suppressed.

Specifically, the structure in which the retractor 42 for applying the seatbelt 41 is fixed to the side face 1 of the vehicle by the front-side attachment portion (Ba, Na) positioned on the forward side of the gravity center G of the retractor 42 and the rear-side attachment portion (Bc, Nc) positioned on the rearward side of the gravity center G of the retractor 42 is known. The retractor 42 is fixed to the vehicle side face 1 such that it protrudes toward the inward side, in the vehicle width direction, in the cantilever state. Accordingly, as shown in FIG. 5, when the tension load Ff is inputted forwardly to the retractor from the seatbelt 41 in the vehicle's collision mode in which the seatbelt 41 gets locked, a moment M which is clockwise in the plan view is applied to the retractor 42 (see the arrow M in FIG. 5). This moment M may easily cause deformation that the front-side attachment portion (Ba, Na) is pushed toward the outward side, in the vehicle width direction.

According to the present embodiment, however, the deformation of the front-side retractor attachment portion (Na) can be suppressed by the gusset portion 52 supporting inside the closed-cross section 4s of the C pillar reinforcement 4 (being stretched in the present embodiment).

Further, since the load applied to the front-side attachment portion (Ba, Na) toward the outward side, in the vehicle width direction, is received by the gusset portion 52 configured to be stretched inside the closed-cross section 4s as described above, the deformation of the front-side retractor attachment portion (Na) can be suppressed effectively without any necessity of increasing the plate thickness of the side panel 2 and the reinforcing member excessively or increasing the number of fastening portions of the retractor 42 to the vehicle body.

Accordingly, the suppression of the vertical vibration of the retractor 42 during the vehicle traveling and the suppression of the deformation of the front-side retractor attachment portion (Na) in the vehicle collision can be properly attained without any improperly increasing the weight and manufacturing costs.

In the embodiment of the present invention, as shown in FIGS. 3 and 9, the front-side retractor attachment portion (Na) is provided at the higher level than the vibration-damping joint portion 53.

According to this embodiment, the vibration energy (vibration) transmitted to the front-side retractor attachment portion (Na) along the side panel 2 from the damper attachment portion 19 can be effectively suppressed (damped) by the vibration-damping joint portion 53 provided in the middle of a transmission path of the vibration energy.

In the embodiment of the present invention, as shown in FIGS. 3, 7 and 8, the vibration-damping joint portion 53 is provided at the point of the reinforcing member 50 which corresponds to the closed-cross section 4s in the vehicle side view.

In this structure, the C pillar reinforcement 4 provided at the side panel 2 corresponds to a load transmission path where the vibration energy is transmitted upwardly from the damper attachment portion 19. Therefore, according to this embodiment, since the vibration-damping joint portion 53 is provided at part of the C pillar reinforcement 4 which corresponds to the load transmission path, the vibration energy (vibration) can be suppressed (damped) effectively by the vibration-damping joint portion 53.

In the embodiment of the present invention, as shown in FIGS. 3, 4 and 8, the vibration-damping joint portion 53 includes the bead 64 which partially protrudes toward the outward side, in the vehicle width direction, of the vibration-damping joint portion 53 so as to engage with the vibration-damping material 63 (see FIGS. 4 and 8) and extends in the longitudinal direction.

According to this embodiment, since the bead 64 engages with the vibration-damping material 63, the vibration damping material 63 can be prevented from dropping from the vibration-damping joint portion 53 during vehicle manufacturing.

Additionally, since the bead 64 is located, in the vertical direction, between the front-side retractor attachment portion (Na) and the gusset portion 52 at the reinforcing member 50, a portion between these portions can be formed as a high-rigidity portion.

Accordingly, the front-side retractor attachment portion (Na) can be suppressed from being deformed in the vehicle width direction in the collision mode in which the seatbelt 41 gets locked.

In the embodiment of the present invention, as shown in FIG. 3, the front-side retractor attachment portion (Na) is located at the position spaced apart, in the longitudinal direction, from the C pillar reinforcement 4, and the high rigidity portions (61, 62, N1b) which are configured to provide deformation suppression against a bending input applied in the vehicle width direction (a load applied toward the outward side, in the vehicle width direction, caused by the clockwise moment M in the plan view) are provided at the reinforcing member 50 at a point located between, in the longitudinal direction, the front-side retractor attachment portion (Na) and the gusset portion 52.

According to this embodiment, it can be suppressed by the high rigidity portions (61, 62, N1b) that the reinforcing member 50 is deformed by the load applied in the vehicle width direction to be inputted to the reinforcing member 50 from the front-side retractor attachment portion (Na) in the vehicle collision.

Consequently, the reinforcing member 50 can firmly receive the load applied in the vehicle width direction to be inputted to the reinforcing member 50 from the front-side retractor attachment portion (Na) by using the gusset portion 52 provided inside its closed-cross section 4s.

Particularly, since the upper edge flange 61 (flange portion) which is formed at the upper edge longitudinally extending of the reinforcing member 50 and the lower edge flange 62 (flange portion) which is formed at the lower edge of the reinforcing member 50 are provided as shown in FIG. 3, the reinforcing member 50 can be reinforced with a simple structure without increasing the weight of the vehicle body which may be caused by providing an additional reinforcing member or thickening the plate thickness of the reinforcing member.

Further, as shown in FIG. 3, the rear-side striker attachment portion (N1b) as the striker attachment portion to attach the striker 25 to the reinforcing member 50 is provided as the high-rigidity portion.

According to this embodiment, since the side panel 2 and the reinforcing member 50 can be integrated and thereby reinforced by each other at the rear-side striker attachment portion (N1b), it can be suppressed by the rear-side striker attachment portion (N1b) that the reinforcing member 50 or the side panel 2 are deformed by the load applied in the vehicle width direction to be inputted to the reinforcing member 50 from the front-side retractor attachment portion (Na) in the vehicle collision.

Further, the load applied toward the outward side, in the vehicle width direction, to be inputted to the reinforcing member 50 from the rear-side striker attachment portion (N1b) can be supported by the gusset portion 52, too. Specifically, in a case where a large baggage is put in a baggage room provided at a vehicle-body rear portion, there is a concern that the baggage may slide forwardly and hit against a seatback of a rear seat because of an inertia of the baggage in the vehicle collision (frontal collision). In this case, the load applied toward the outward side, in the vehicle width direction, is inputted to the reinforcing member 50 from the rear-side striker attachment portion (N1b). The gusset portion 52 can firmly support this load applied toward the outward side, in the vehicle width direction, to be inputted to the reinforcing member 50 from the rear-side striker attachment portion (N1b) as well.

In the embodiment of the present invention, as shown in FIG. 3, the striker attachment portion is the rear-side striker attachment portion (N1b) which is provided at a point spaced rearwardly apart from the C pillar reinforcement 4, the striker 25 is fixed to the reinforcing member 50 by the rear-side striker attachment portion (N1b) and the front-side striker attachment portion (N1a) which is provided at a point corresponding to the closed-cross section 4s in the vehicle side view, and the base portion 26 provided at the striker 25 is provided to extend between the front-side striker attachment portion (N1a) and the rear-side striker attachment portion (N1b).

According to this embodiment, since the rear-side striker attachment portion (N1b) provided at the point closer to the front-side retractor attachment portion (Na) than the C pillar reinforcement 4 and the front-side striker attachment portion (N1a) provided inside the closed-cross section 4s are connected via the base portion 26, the reinforcing effect by means of the rear-side striker attachment portion (N1b) can be enhanced.

In the embodiment of the present invention, as shown in FIGS. 1 and 3, the C pillar reinforcement 4 and the reinforcing member 50 are fixed on the cabin outside of the side panel 2.

According to this embodiment, since the gusset portion 52 is configured to be stretched against the load inputted to the reinforcing member 50 toward the outward side, in the vehicle width direct, from the front-side striker attachment portion (Na) in the collision mode in which the seatbelt 41 gets locked, the deformation of the front-side seatbelt-retractor attachment portion (Na) in the vehicle collision can be suppressed effectively.

The present invention is not limited to the above-described embodiment, but can be materialized by various modifications.

For example, the present invention is not limited to the structure of the present embodiment in which the damper attachment portion 19 as the rear-suspension attachment portion is provided at the rear frame, but this damper attachment portion 19 may be provided at any other portions, such as a top portion of a rear wheelhouse (arch-shaped portion).

Further, the frame member (C pillar reinforcement 4) and the reinforcing member (5) may be fixed on the cabin inside of the side panel (2). In this case, the suppression of the vertical vibration of the retractor during the vehicle traveling and the suppression of the deformation of the retractor attachment portion in the vehicle collision can be compatibly attained as well.

Thus, the frame member and the reinforcing member may be fixed not only on the cabin inside but on the cabin inside of the side panel.

Moreover, while the retractor 42 of the present embodiment is attached to the side face 1 from the cabin side, the number or shape of the brackets are not limited to the above-described ones. Also, the retractor 42 may be attached directly without any bracket.

What is claimed is:

1. A side vehicle-body structure of a vehicle, comprising:
a rear suspension suspending a rear wheel;
a side panel constituting a side face of the vehicle at a higher level than a rear-suspension attachment portion to attach the rear suspension to the vehicle;
a seatbelt retractor attached to a cabin-inside face of the side panel;
a frame member forming a closed-cross section extending vertically in corporation with the side panel; and
a reinforcing member attached to the side panel,
wherein said reinforcing member comprises a retractor attachment portion to attach said seatbelt retractor, a gusset portion to partition the closed-cross section of said frame member vertically, and a vibration-damping joint portion joined to said side panel via a vibration-damping material,
said reinforcing member is formed integrally by a member which is configured to be continuous over a range of said retractor attachment portion, said gusset portion and said vibration-damping joint portion, and
said retractor attachment portion is provided at a higher level than said vibration-damping joint portion.

2. The side vehicle-body structure of the vehicle of claim 1, wherein said vibration-damping joint portion is provided at a point of said reinforcing member which corresponds to said closed-cross section in a vehicle side view.

3. The side vehicle-body structure of the vehicle of claim 2, wherein said vibration-damping joint portion includes a bead which partially protrudes toward an inward side or an outward side, in a vehicle width direction, of the vibration-damping joint portion so as to engage with said vibration-damping material and extends in a longitudinal direction.

4. The side vehicle-body structure of the vehicle of claim 3, wherein said retractor attachment portion is located at a position spaced apart, in a longitudinal direction, from said frame member, and a high rigidity portion which is configured to provide deformation suppression against a bending input applied in a vehicle width direction is provided at said reinforcing member at a point located between, in the longitudinal direction, said retractor attachment portion and said gusset portion.

5. The side vehicle-body structure of the vehicle of claim 4, wherein said high-rigidity portion is a flange portion which is formed at an edge portion extending in the longitudinal direction of said reinforcing member.

6. The side vehicle-body structure of the vehicle of claim 5, wherein said high-rigidity portion is a striker attachment portion to attach a striker fixed to the cabin-inside face of said side panel to said reinforcing member.

7. The side vehicle-body structure of the vehicle of claim 6, wherein said striker attachment portion is a rear-side striker attachment portion which is provided at a point closer to said retractor attachment portion, in a vehicle longitudinal direction, than said frame member, said striker is fixed to said reinforcing member by said rear-side striker attachment portion and a front-side striker attachment portion which is provided at a point corresponding to said closed-cross section in a vehicle side view, and a striker base portion provided at said striker is provided to extend between said rear-side striker attachment portion and said front-side striker attachment portion.

8. The side vehicle-body structure of the vehicle of claim 7, wherein said retractor attachment portion is a front-side retractor attachment portion which attaches a point of said seatbelt retractor which is located on a forward side of a gravity center of the seatbelt retractor, and said frame member and said reinforcing member are fixed on a cabin outside of said side panel.

9. The side vehicle-body structure of the vehicle of claim 1, wherein said vibration-damping joint portion includes a bead which partially protrudes toward an inward side or an outward side, in a vehicle width direction, of the vibration-damping joint portion so as to engage with said vibration-damping material and extends in a longitudinal direction.

10. The side vehicle-body structure of the vehicle of claim 1, wherein said retractor attachment portion is located at a position spaced apart, in a longitudinal direction, from said frame member, and a high rigidity portion which is configured to provide deformation suppression against a bending input applied in a vehicle width direction is provided at said reinforcing member at a point located between, in the longitudinal direction, said retractor attachment portion and said gusset portion.

11. The side vehicle-body structure of the vehicle of claim 1, wherein said retractor attachment portion is a front-side retractor attachment portion which attaches a point of said seatbelt retractor which is located on a forward side of a gravity center of the seatbelt retractor, and said frame member and said reinforcing member are fixed on a cabin outside of said side panel.

* * * * *